United States Patent [19]
Kajiura et al.

[11] Patent Number: 5,955,807
[45] Date of Patent: Sep. 21, 1999

[54] SYNCHRONOUS ELECTRIC MACHINE HAVING AUXILIARY PERMANENT MAGNET

[75] Inventors: Hiroaki Kajiura, Nagoya; Keiichiro Banzai, Toyota; Sumio Yanase, Okazaki; Akira Fukushima, Kariya, all of Japan

[73] Assignee: Denso Corporation, Kariya, Japan

[21] Appl. No.: 09/066,749

[22] Filed: Apr. 27, 1998

[30] Foreign Application Priority Data

| Apr. 25, 1997 | [JP] | Japan | 9-108693 |
| Jul. 16, 1997 | [JP] | Japan | 9-190892 |
| Jul. 22, 1997 | [JP] | Japan | 9-195299 |
| Jan. 14, 1998 | [JP] | Japan | 10-005548 |

[51] Int. Cl.$^6$ .......... H02K 21/12; H02K 19/00; H02K 1/22; H02K 1/00
[52] U.S. Cl. .......... 310/156; 310/162; 310/261; 310/181; 310/184; 310/216
[58] Field of Search .......... 310/181, 156, 310/261, 210, 211, 263, 262, 49 R, 112, 114, 115, 121, 162–165, 179–182, 191, 197, 198, 209, 216–218, 264, 265, 269, 184

[56] References Cited

U.S. PATENT DOCUMENTS

| 4,700,097 | 10/1987 | Kawada et al. | 310/162 |
| 4,914,335 | 4/1990 | Horton et al. | 310/207 |
| 4,922,152 | 5/1990 | Gleghorn et al. | 310/156 |
| 5,483,116 | 1/1996 | Kusase et al. | 310/263 |
| 5,552,651 | 9/1996 | Radomski | 310/181 |
| 5,666,015 | 9/1997 | Uchibori et al. | 310/261 |
| 5,786,650 | 7/1998 | Uchida et al. | 310/156 |
| 5,808,390 | 9/1998 | Miyazawa et al. | 310/194 |

FOREIGN PATENT DOCUMENTS

| 4-165950 | 6/1992 | Japan . |
| 6-351206 | 12/1994 | Japan . |
| 9-098556 | 4/1997 | Japan . |

Primary Examiner—Nestor Ramirez
Assistant Examiner—Dang Dinh Le
Attorney, Agent, or Firm—Pillsbury Madison & Sutro LLP

[57] ABSTRACT

A synchronous electric machine includes a stator having an armature winding, a rotor having axially laminated magnetic sheets and a field coil, a plurality of permanent magnets disposed in the rotor to form N-pole and S-pole on the outer circumference of the rotor, and ribs and pins magnetically bypassing the N-poles and S-poles of the permanent magnets. The pins also attach the laminated magnetic sheets together as a unit. The rotor has a plurality of axially extending holes on its circumference for accommodating permanent magnets.

24 Claims, 17 Drawing Sheets

SYNCHRONOUS ELECTRIC MACHINE HAVING AUXILIARY PERMANENT MAGNET

CROSS REFERENCE TO RELATED APPLICATION

The present application is based on and claims priority from Japanese Patent Applications Hei-9-108693 filed on Apr. 25, 1997, Hei-9-190892 filed on Jul. 16, 1997, Hei-9-195299 filed on Jul. 22, 1997 and Hei-10-5548 filed on Jan. 14, 1998, the contents of which are incorporated herein by reference.

BACKGROUND OF THE INVENTION

1. Field of the Invention

The present invention relates to a synchronous electric machine having auxiliary permanent magnets for an electric vehicle.

2. Description of the Related Art

When an electric vehicle with a synchronous electric machine having auxiliary permanent magnets is running on a downhill road, the electric machine is driven by the wheels and generates a high output voltage. In order to withstand such output voltage, the size of the electric machine and the electric power inverter thereof become large. The output voltage of this kind of electric machine is generally controlled by changing the armature reaction. In other words, the output voltage becomes maximum when the armature reaction cannot be changed. On the other hand, when the permanent magnets are exposed to the armature reaction, the permanent magnets are subject to irreversible demagnetization.

JP-A-6-351206 proposes a synchronous electric machine having permanent magnets which is aimed to solve the above problem. This electric machine is composed of a stator having a field coil as well as an armature coil and a rotor having permanent magnets on one side of the outer periphery thereof and magnetic cores on the other side. Thus, the magnetic flux supplied to the armature coil is controlled by the field coil to prevent generation of an abnormally high output voltage. However, because fluctuating magnetic flux of the stator passes through the core sheets of the stator, the iron loss is substantial, reducing in the efficiency of the electric machine.

SUMMARY OF THE INVENTION

A main object of the present invention is to provide a highly efficient synchronous electric machine which has a rotor composed of axially laminated magnetic sheets and a field coil disposed therein, a plurality of permanent magnets disposed in the rotor to form N-pole and S-pole on the outer circumference thereof, and a plurality of magnetic members which magnetically bypass the N-poles and S-poles of the permanent magnets.

Thus, the permanent magnets are protected from being exposed to the armature reaction and irreversible demagnetization without substantial iron loss.

Another object of the present invention is to provide a synchronous electric machine which has a rotor with a plurality of cores composed of axially laminated magnetic sheets, a field coil disposed in the cores, a plurality of permanent magnets disposed in the cores to form N-pole and S-pole on the outer circumference of the rotor, and a plurality of magnetic members which magnetically bypass the N-poles and S-poles and fixing the cores in a unit.

Another object of the present invention is to provide a synchronous electric machine which has a rotor composed of a first rotor yoke having a magnetic center core and a plurality of magnetic ribs extending from the center core to magnetically connect opposite sides of the permanent magnets, an annular second rotor yoke having a plurality of permanent magnets forming N-pole and S-pole on the outer periphery of the rotor, and a field coil disposed in the spaces between the magnetic ribs to provide controlled magnetic flux to the stator.

Another object of the present invention is to provide a synchronous electric machine which has a rotor composed of a front rotor yoke having a front center core and a plurality of front ribs extending from the center core, a rear rotor yoke having a rear center core and a plurality of rear ribs extending from the center core, a ring-shaped rotor yoke covering the front and rear rotor yokes and having a plurality of permanent magnets forming N-poles and S-poles on the outer periphery of the ring-shaped rotor yoke, and a field coil disposed in the spaces defined by the front and rear ribs for providing controlled magnetic flux to the stator.

A further object of the present invention is to provide a synchronous electric machine which includes a stator having a stationary cylindrical center core and a rotor composed of a rotor yoke having a rotary center core and a plurality of first magnetic ribs extending from the rotary center core, a plurality of second magnetic ribs having a member extending spaced-apart from outer periphery of the stationary center core; a non-magnetic member mechanically connecting the first and second magnetic ribs, a ring-shaped rotor yoke disposed on the outer periphery of the rotor yoke and having a plurality of permanent magnets forming N-poles and S-poles on the outer periphery of the ring-shaped rotor yoke; and a field coil disposed in the spaces defined by the first and second magnetic ribs for providing controlled magnetic flux to the stator. The magnetic ribs are arranged to magnetically connect opposite sides of each of the permanent magnets.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF CURRENTLY PREFERRED EMBODIMENTS

Figure 1:
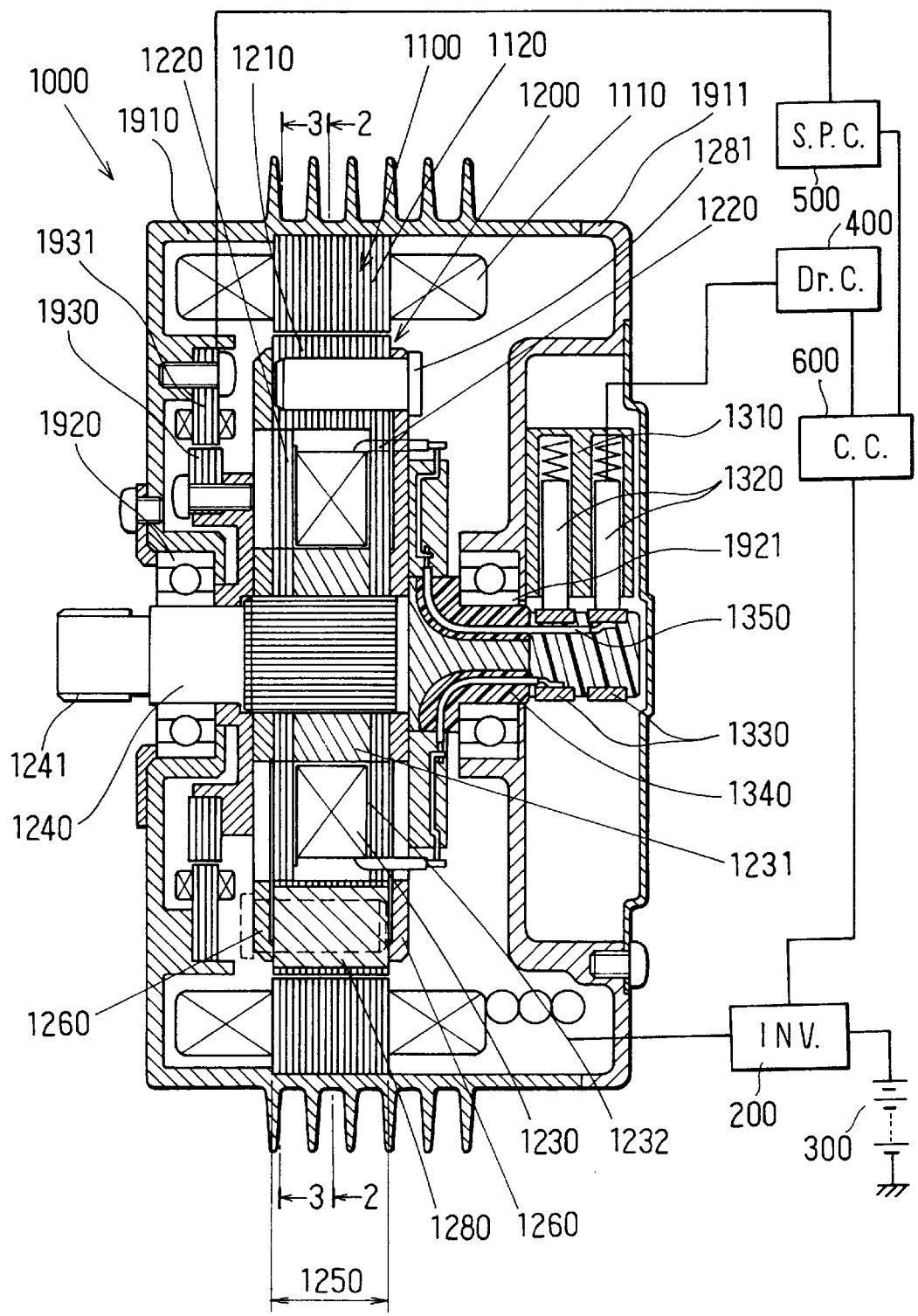
FIG. 1 is a schematic cross-sectional side view illustrating a synchronous electric machine according to a first embodiment of the present invention.

A synchronous electric machine according to a first embodiment is described with reference to FIGS. 1–3.

Synchronous electric machine 1000 is composed of front frame 1910, rear frame 1911, stator 1100 disposed in front frame 1910, rotor 1200 disposed inside stator 1100 with an air gap, brush holder 1310, brush 1320, slip rings 1330, resolver rotor 1930, and resolver stator 1931.

Stator 1100 has three-phase coil 1110 and stator core 1120 composed of laminated rolled-magnetic-steel-plates. Stator core 1120 has a plurality of slots 1121 and teeth 1122 for accommodating three-phase coil 1110 and core back 1123.

Rotor 1200 has cylindrical center core 1231, shaft 1240 which is supported by a pair of bearing 1920, 1921 fixed respectively to front frame 1910 and rear frames 1911, rotor yokes 1210, 1220, field coil 1230 disposed inside rotor yoke 1210 and a pair of nonmagnetic disk-like end plates 1260 disposed at opposite ends thereof. Rotor yokes 1210, 1220, field coil 1230 and cylindrical center core 1231 form a portion of electromagnetic circuit unit 1250. Shaft 1240 has spline 1241 at the front (right in FIG. 1) end thereof. Shaft 1240 has also a serrated outer periphery, which is press-fit into cylindrical center core 1231. Field coil 1230 is held in resinous bobbin 1232, which is held between a pair of rotor yokes 1220 and rib portions 1223 at the opposites ends thereof. Field coil 1230 is supplied with electric current through brush 1320, slip rings 1330 and lead wires 1350 which is covered by insulating member 1340.

Rotor yoke 1210 is made of cylindrical laminated rolled-magnetic-steel-plates and has a plurality (n) of axially extending rectangular holes 1211, which are formed along a circumference of the end surfaces of yoke 1210 at equal intervals. Respective one of round holes 1212 is also formed at the middle between adjacent rectangular holes 1211.

A pair of rotor yokes 1220 is also made of laminated rolled-magnetic-steel-plates. Each rotor yoke 1220 has an annular portion 1221, a boss portion 1222, and a plurality of rib portions 1223 connecting annular portion 1221 and boss portion 1222 at equal intervals. Annular portion 1221 has the same number and shape of rectangular holes 1224 and round holes 1225 as the axially extending holes 1211 and round holes 1212 of rotor yoke 1210. Respective one of round holes 1225 is also disposed at the middle between adjacent rectangular holes 1224. The number of rib portions 1223 is a half of the number (n) of rectangular holes 1224 or round holes 1225, therefore the interval between adjacent rib portions 1223 is 720/n degree in angle. Rib portions 1223 of one of rotor yokes 1220 is disposed between rib portions 1223 of the other, as shown in FIG. 3.

Permanent magnet 1280 is inserted into each one of rectangular holes 1211, 1224 so that the magnetic polarity of adjacent permanent magnets can be the same. Soft iron pin 1281 having the same shape as round hole 1213, 1225 is press-fit into each of round holes 1212, 1225 to fix rotor yokes 1210, 1220 as a unit. Thus, the soft iron pin magnetically connects rotor yokes 1220 disposed at opposite ends of rotor 1200.

Three-phase armature coil 1110 is connected to electric power inverter 200, which is connected to battery 300. Brushes 1320 are connected to field drive circuit 400. Resolver stator 1931 is connected to signal processing circuit 500. Synchronous electric machine 1000 also has a control circuit 600 which controls inverter 200, field drive circuit 400, and signal processing circuit 500.

Figure 3:
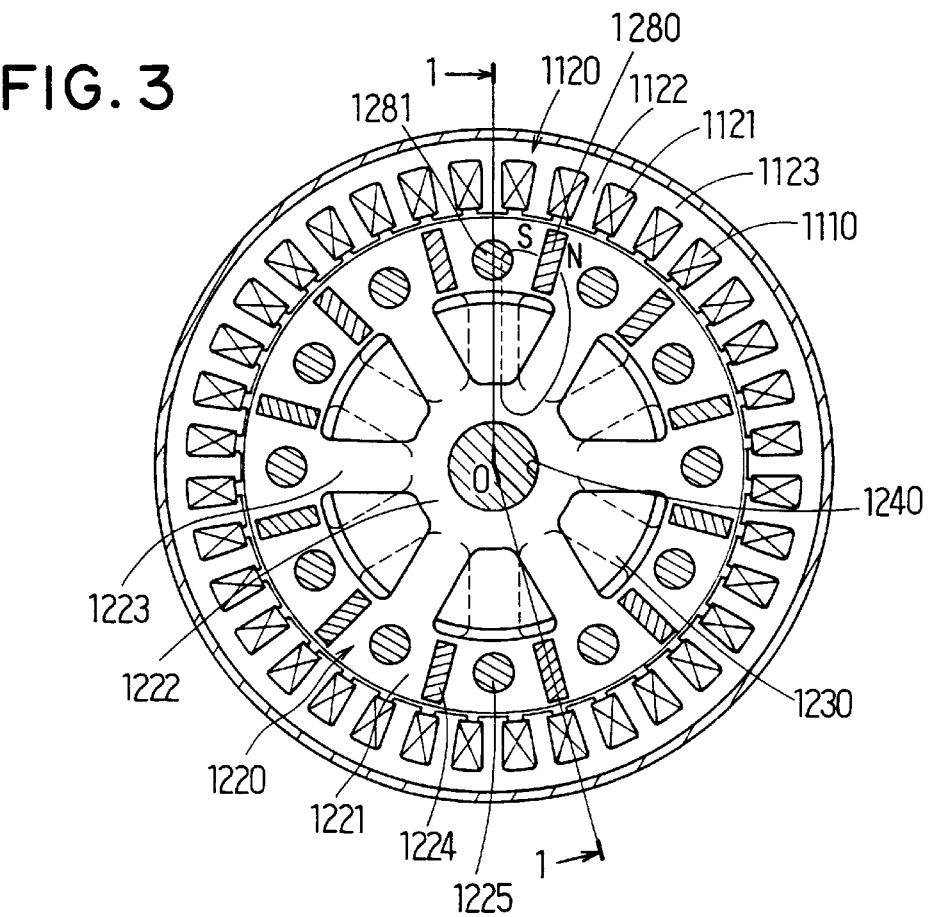
FIG. 3 is a schematic cross-sectional front view of the synchronous electric machine cut along line 3—3 in FIG. 1.
Figure 4:
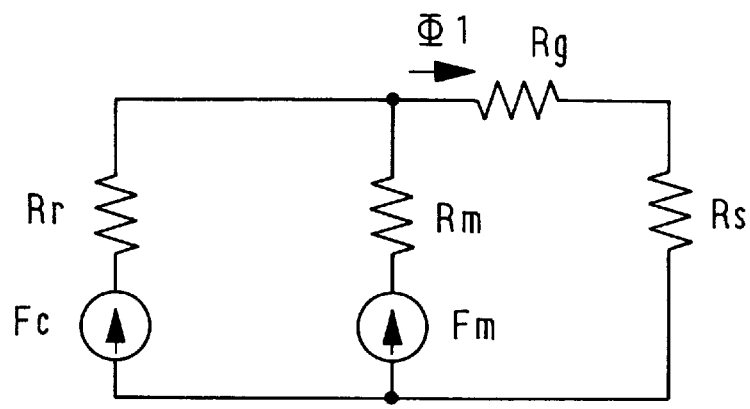
FIG. 4 is a magnetic circuit diagram of the synchronous electric machine according to the first embodiment.

Each permanent magnets 1280 installed in rotor 1200 is magnetized in the circumferential direction so that rotor 1200 provides N-pole and S-pole alternately, on the circumference thereof. Because soft iron pin 1281 connects rotor yokes 1220 on opposite ends, the N-pole of each permanent magnets 1280 is magnetically connected through one of rib portion 1223, cylindrical center core 1231, adjacent rib portions 1223, and pin 1281 to the S-pole of the same permanent magnet, as illustrated in FIG. 3. Thus, a part of the effective magnetic flux supplied to stator 1100 is bypassed so that permanent magnets 1280 can be protected from the excessive armature reaction. In the magnetic circuit diagram shown in FIG. 4, the following expression can be formed among reluctance Rs of the stator, reluctance Rg of the air gap, reluctance of the permanent magnet Rm, reluctance of the bypass circuit Rr, magnetomotive force Fm of the permanent magnets, and magnetomotive force Fc of field coil 400.

$$\Phi 1 \approx (RmFc+RrFm)/[RrRm+Rm(Rg+Rs)+Rr(Rg+Rs)]$$

If field coil 1230 is not energized and Fc=0, $$\Phi 10 \approx RrFm/[RrRm+Rm(Rg+Rs)+Rr(Rg+Rs)], \text{ and}$$

$$\Phi 10 \approx 0,$$

because reluctance Rr of the bypass circuit is small.

The reluctance Rr can be adjusted by changing the sectional area and length of pins 1281, rib portions 1223, and center core 1231. The flux density of the magnetic circuit between rotor 1200 and stator 1100 is arranged less than 1 T (tesla) to be on the straight portion of the B-H curve of the magnetic circuit. Thus, the effective magnetic flux can be reduced in proportion to the amount of reduced field current.

If field coil 1230 is energized, magnetomotive force Fc provides magnet flux $\Phi 1c$, which is RmFc/[RrRm+Rm(Rg+Rs)+R r(Rg+Rs)]. Thus, the effective magnetic flux $\Phi 1$ is expressed as:

$$\Phi 1 = \Phi 10 + \Phi 1c$$

Therefore, the effective magnetic flux can be controlled by controlling the field current supplied to field coil 1230, and $\Phi 10$ is supplied as the effective flux for the normal operation of the vehicle.

If shaft 1240 is driven by wheels of an electric vehicle at a low speed, the field current is increased to increase effective magnetic flux $\Phi 1$. This reduces the drive current supplied to armature coil 1110.

If shaft 1240 is driven by the wheels at a high speed, the field current is reduced to zero so that only the magnetic flux of permanent magnets 1280 is applied to stator 1100. Accordingly, the harmonic wave of the magnetic flux, which is otherwise caused by the field coil supplied with field current, can be reduced and iron core loss of the stator and rotor can be reduced.

A synchronous electric machine according to a second embodiment is described with reference to FIG. 5. Permanent magnets 1280 are disposed radially inner sides of soft iron pins 1281. Permanent magnets 1280 are magnetized in the radial direction so that the polarity of one of the permanent magnets 1280 can have the opposite polarity of the adjacent permanent magnet. A plurality of grooves 1284 are formed along the circumference to isolate adjacent permanent magnets 1280 from each other. Other portions and their functions are substantially similar to that described for the first embodiment.

Figure 6:
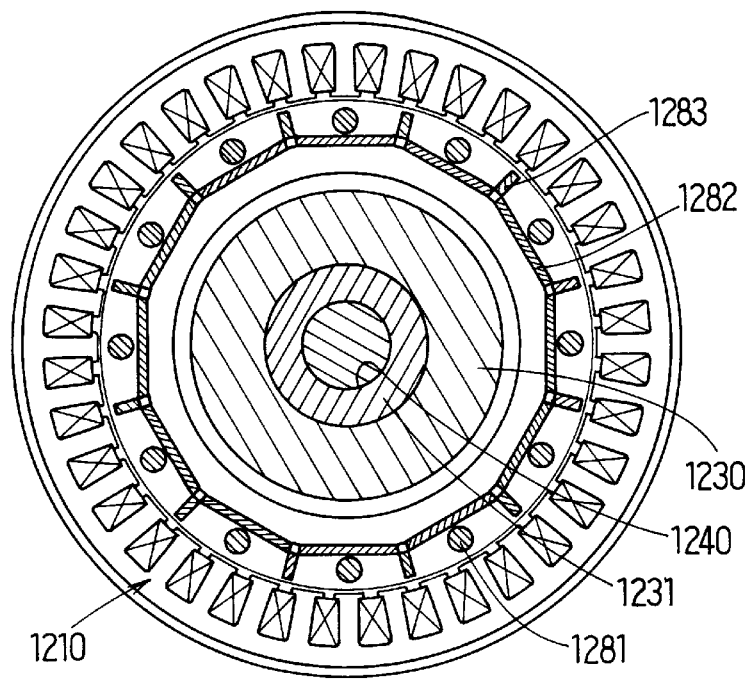
FIG. 6 is a schematic cross-sectional front view of a synchronous electric machine according to a third embodiment of the present invention.

A synchronous electric machine according to a third embodiment is shown in reference to FIG. 6.

Figure 2:
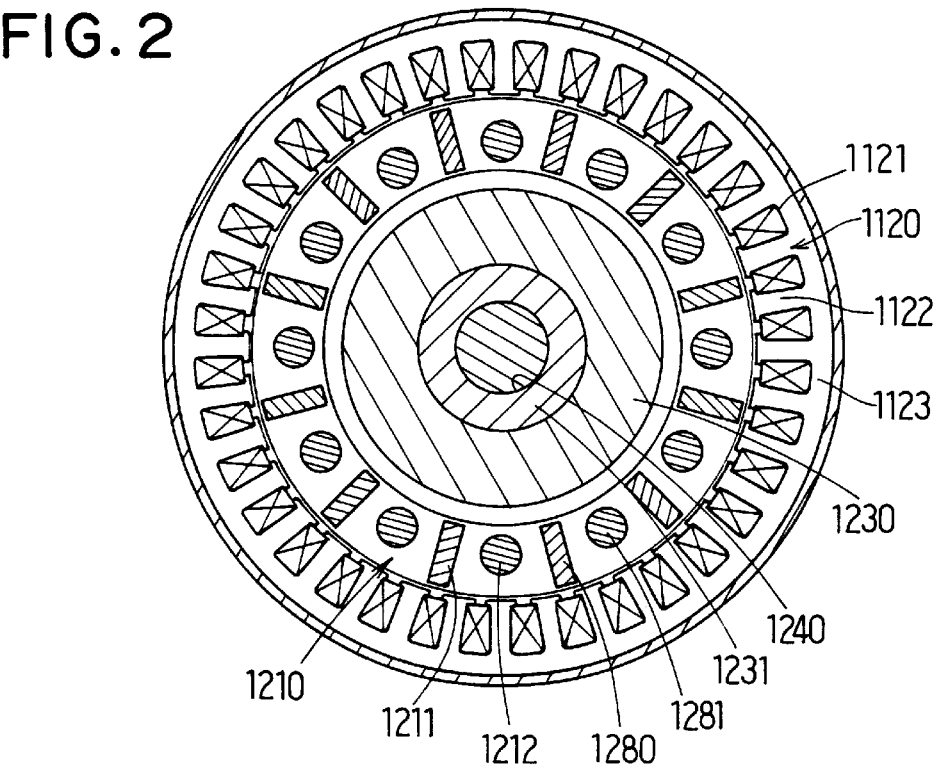
FIG. 2 is a schematic cross-sectional front view of the synchronous electric machine cut along line 2—2 in FIG. 1.
Figure 5:
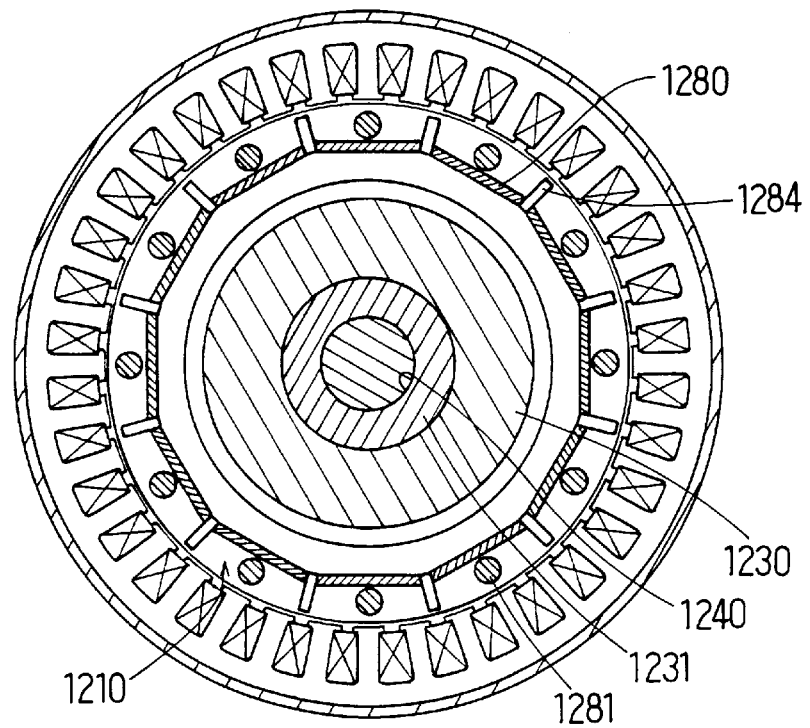
FIG. 5 is a schematic cross-sectional front view of a synchronous electric machine according to a second embodiment of the present invention.

Additional permanent magnets 1283 are inserted into grooves 1284, shown in FIG. 5, to increase the effective magnetic flux in the same manner as shown in FIG. 2.

Figure 7:
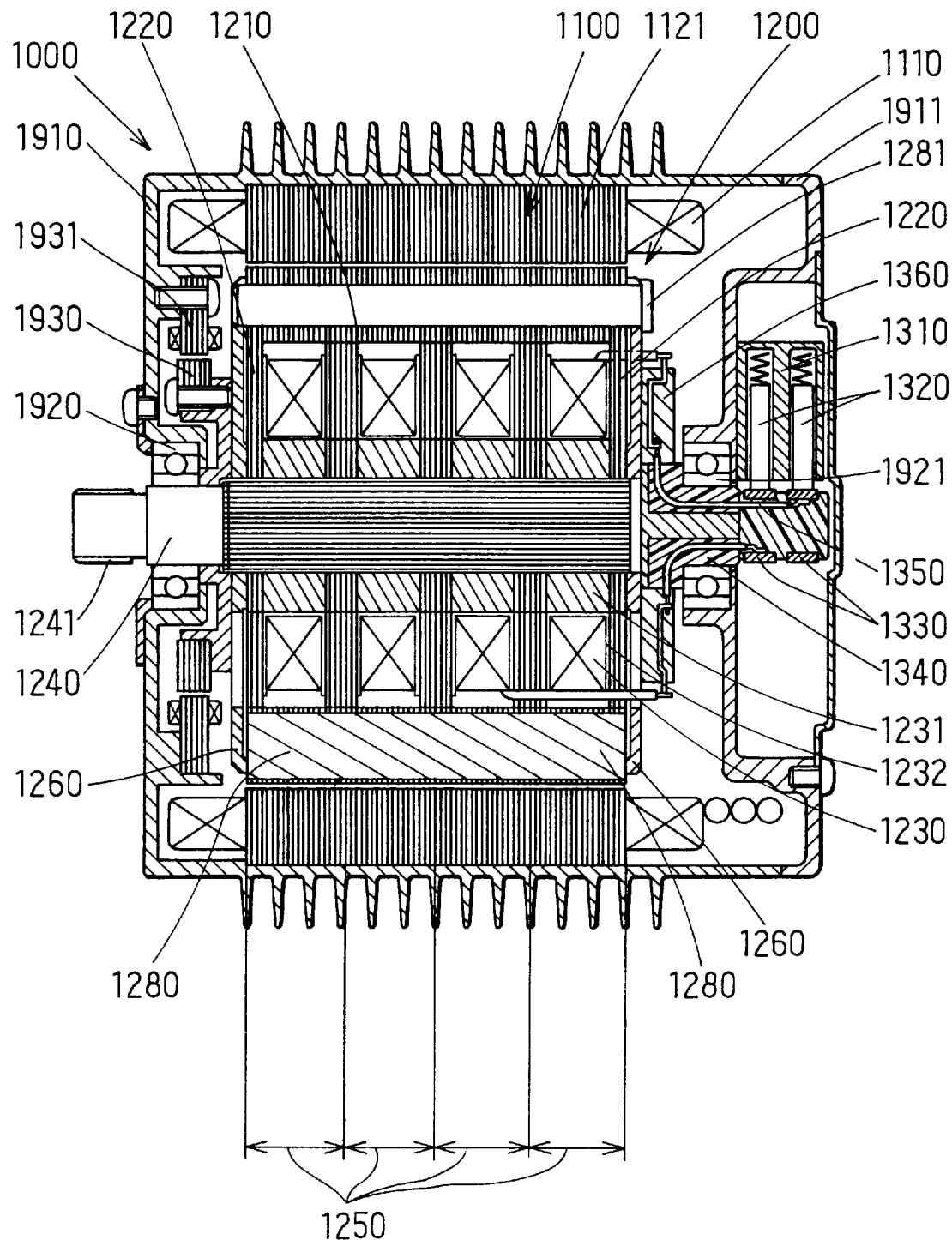
FIG. 7 is a schematic cross-sectional side view of a synchronous electric machine according to a fourth embodiment of the present invention.

A synchronous electric machine according to a fourth embodiment is described with reference to FIG. 7.

The synchronous electric machine 1000 according to the fourth embodiment has a rotor 1200 that is different from the preceding embodiments. Rotor 1200 has a plurality of layers of magnetic circuit units 1250, each composed of a rotor yoke 1210, a pair of rotor yokes 1220, and a field coil 1230. The layers of magnetic circuit units are covered by a pair of non-magnetic disc-like end plates 1260. Permanent magnets 1280 and soft iron pins 1281 extend through respective rectangular holes 1211 and round holes 1212 of all the yokes. However, each magnetic circuit unit 1250 or each group (e.g. groups of two) thereof can have its own permanent magnets 1280. Other portions are similar to those described in relation to of the first embodiment.

The structures specific to the second or third embodiment can be applied to this embodiment also.

Figure 9:
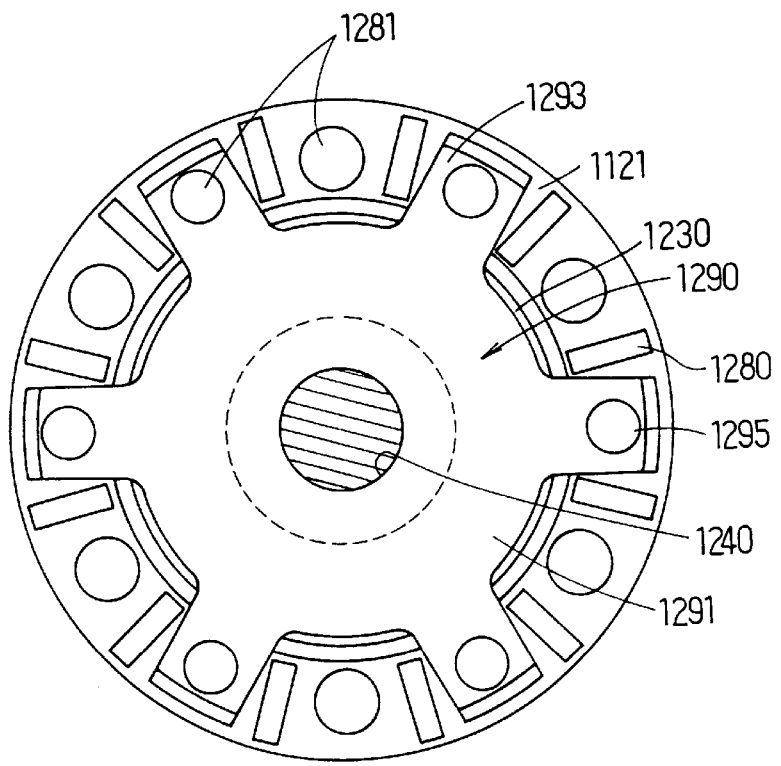
FIG. 9 is a schematic cross-sectional front view of the synchronous electric machine shown in FIG. 8 viewed from the portion indicated by arrow P.
Figure 8:
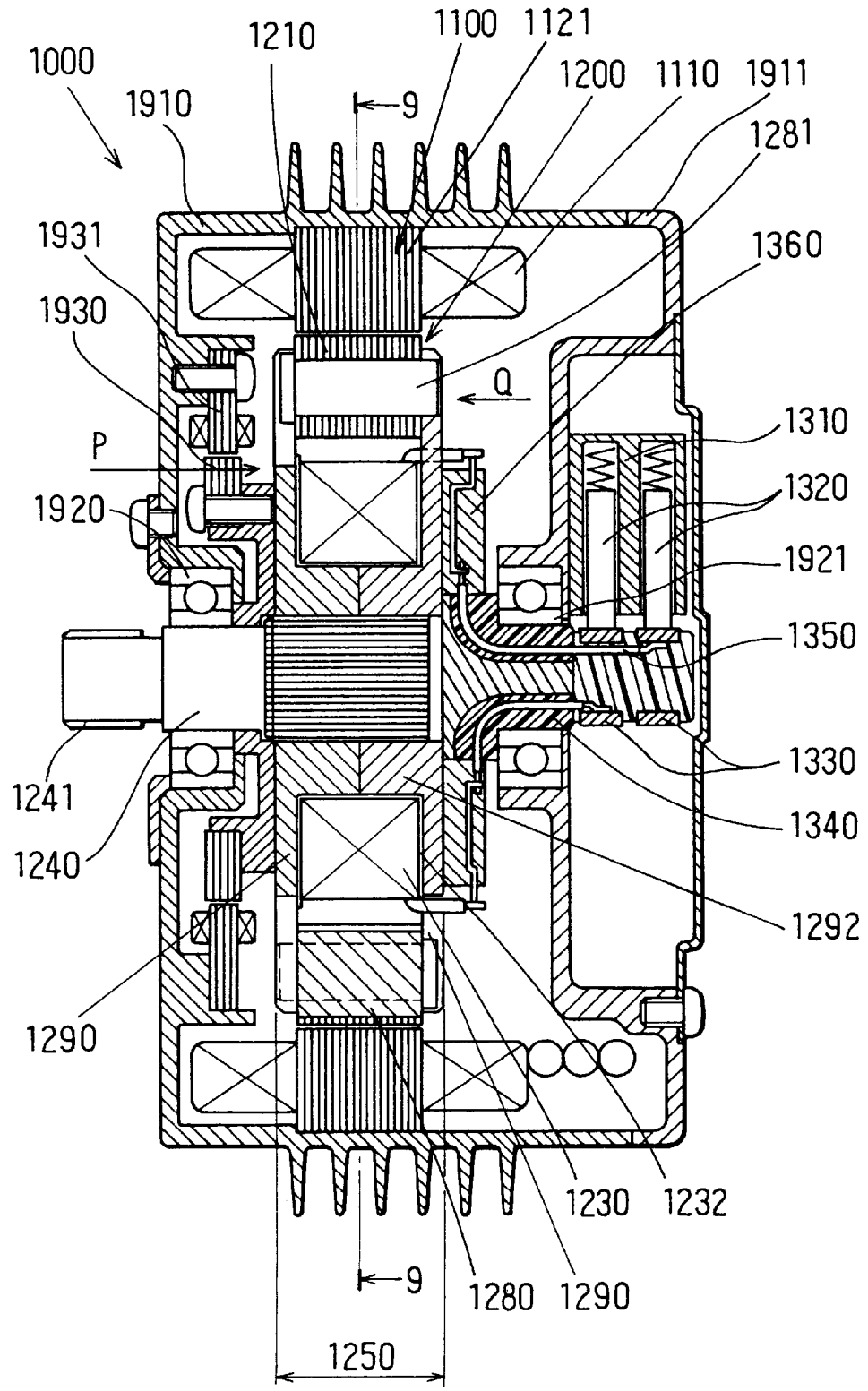
FIG. 8 is a schematic cross-sectional side view of a synchronous electric machine according to a fifth embodiment of the present invention.
Figure 10:
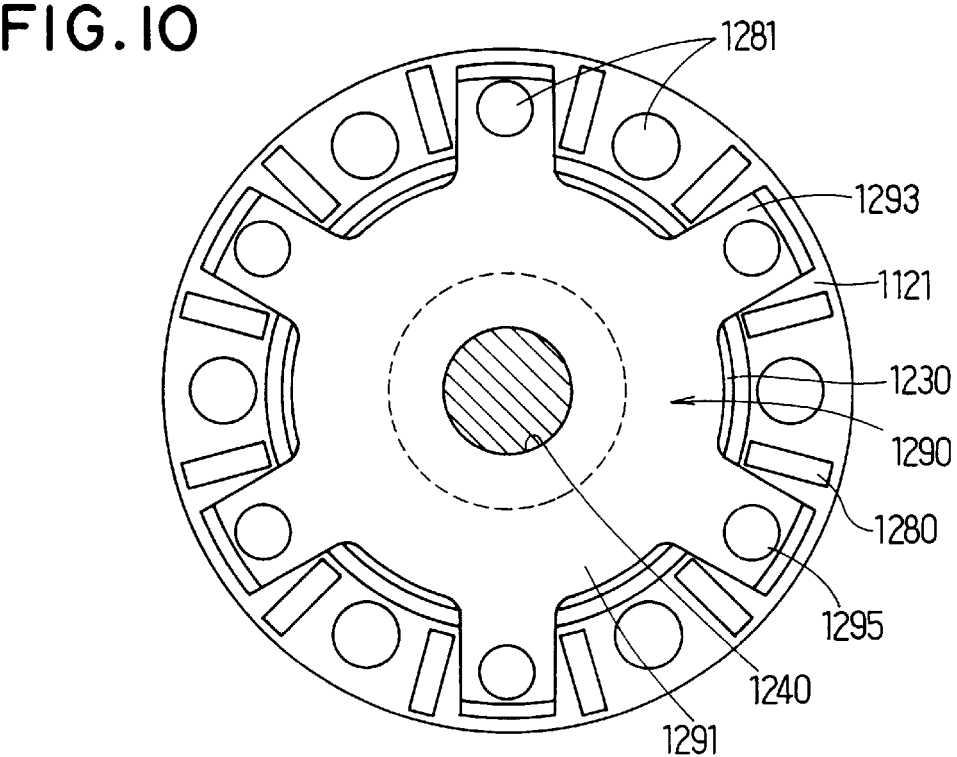
FIG. 10 is a schematic cross-sectional rear view of the synchronous electric machine shown in FIG. 8 viewed from the portion indicated by arrow Q.

A synchronous electric machine according to a fifth embodiment is described with reference to FIGS. 8–10. FIG. 9 is a front view of rotor 1200 viewed from a portion indicated by arrow P in FIG. 8, and FIG. 10 is a rear view of rotor 1200 viewed from the portion indicated by Q.

Rotor 1200 has a pair of rotor yokes 1290 made from a soft iron lump instead of a center core 1231 and rotor yokes 1220 as in the preceding embodiments. Each rotor yoke 1290 is formed by forging soft iron lumps to have disk portion 1291, boss portion 1292, and rib portions 1293. Boss portion 1292 has a through-hole for shaft 1240, and each of rib portions 1293 has a round hole 1295 for iron pin 1281, which corresponds to round hole 1212 shown in FIG. 2. Magnetic circuit unit 1250 has resinous bobbin 1232 and field coil 1230 between a pair of rotor yokes 1290 in the same manner as the first embodiment.

Thus, non-magnetic end plates 1260 can be omitted. Other portions and the operation are substantially the same as in the first embodiment. The structures specific to the second or third embodiment can be applied to this embodiment also.

Figure 12:
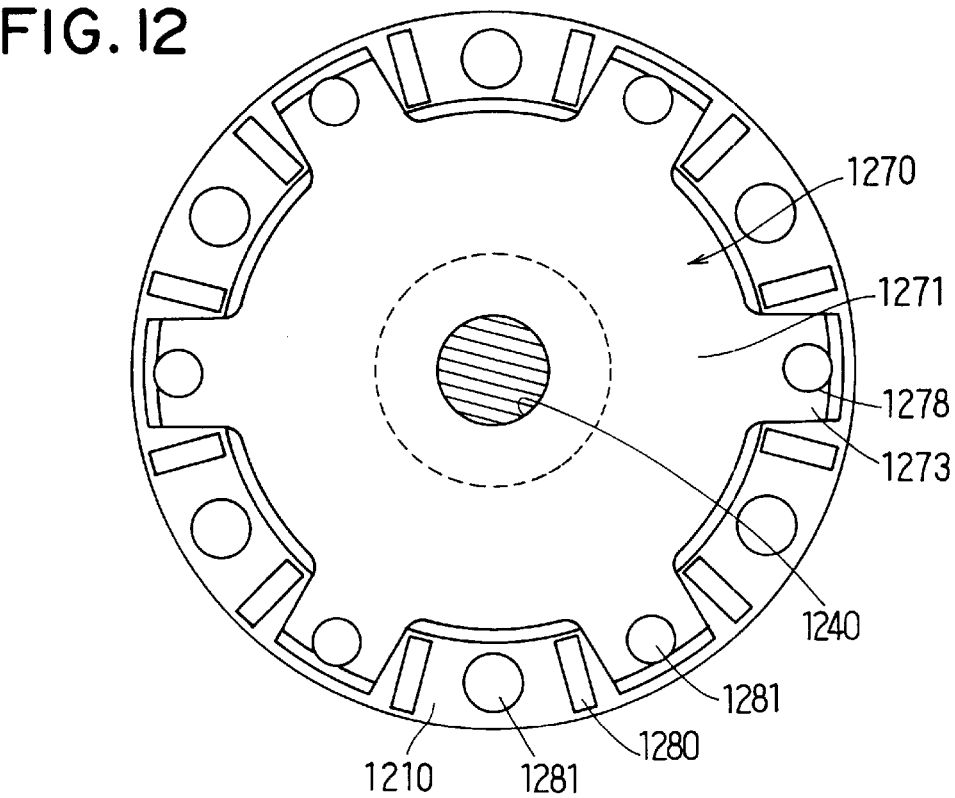
FIG. 12 is a schematic cross-sectional front view of the synchronous electric machine shown in FIG. 11 viewed from the portion indicated by arrow P.
Figure 11:
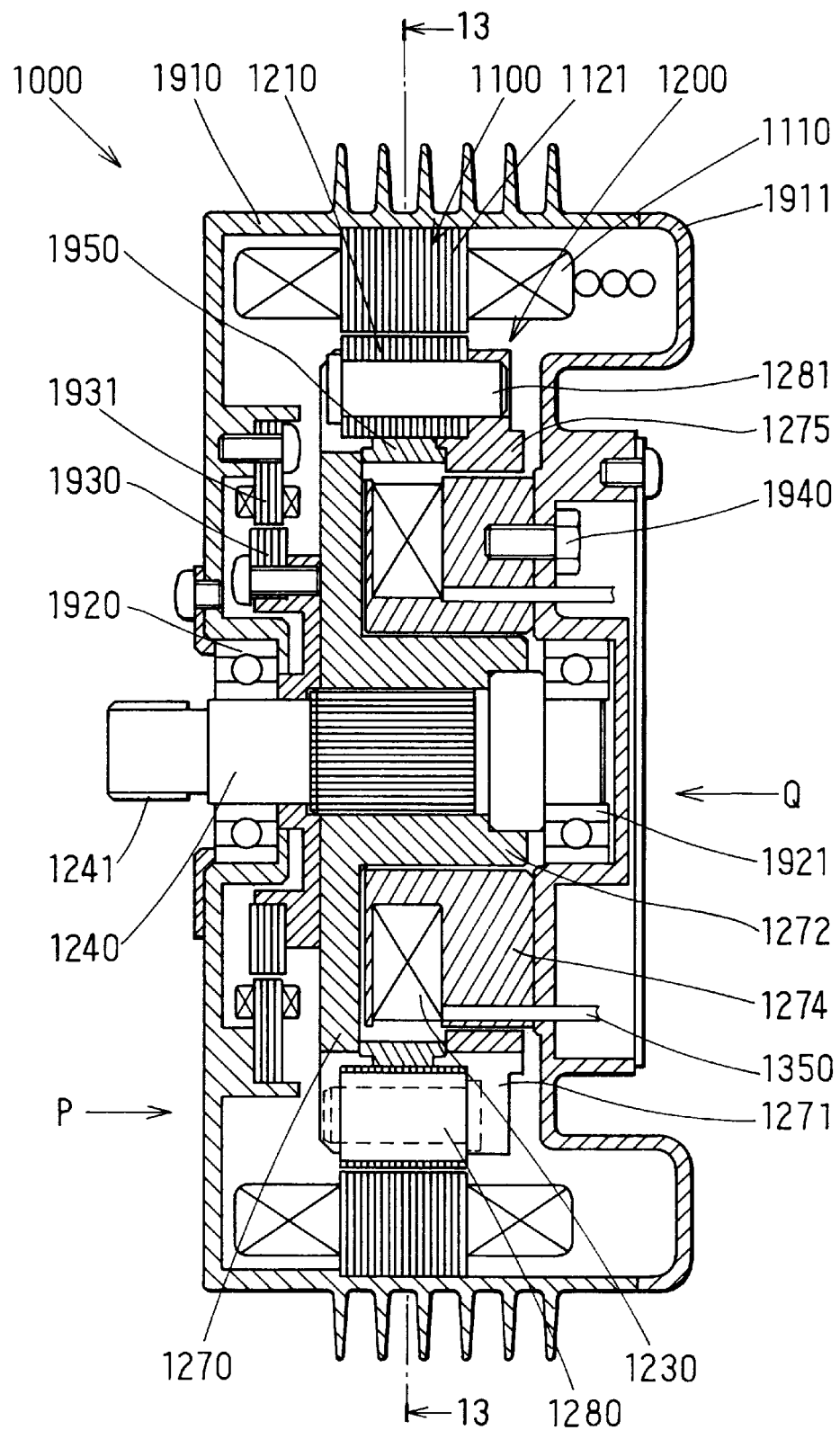
FIG. 11 is a schematic cross-sectional side view of a synchronous electric machine according to a sixth embodiment of the present invention.
Figure 13:
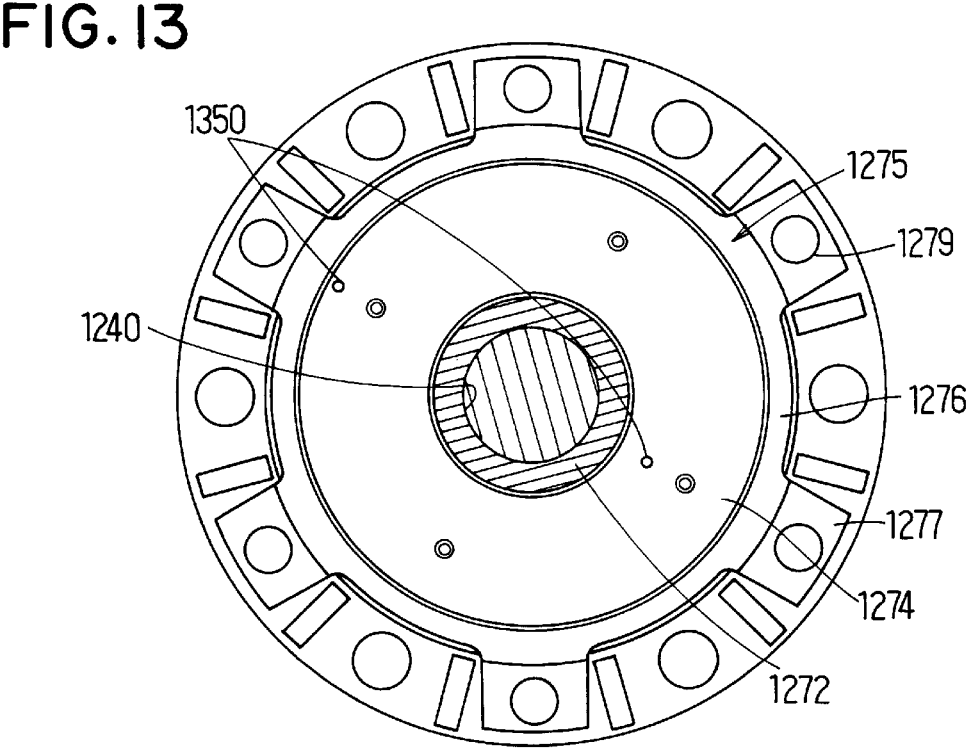
FIG. 13 is a schematic cross-sectional rear view of the synchronous electric machine shown in FIG. 11 viewed from the portion indicated by arrow Q.
Figure 14:
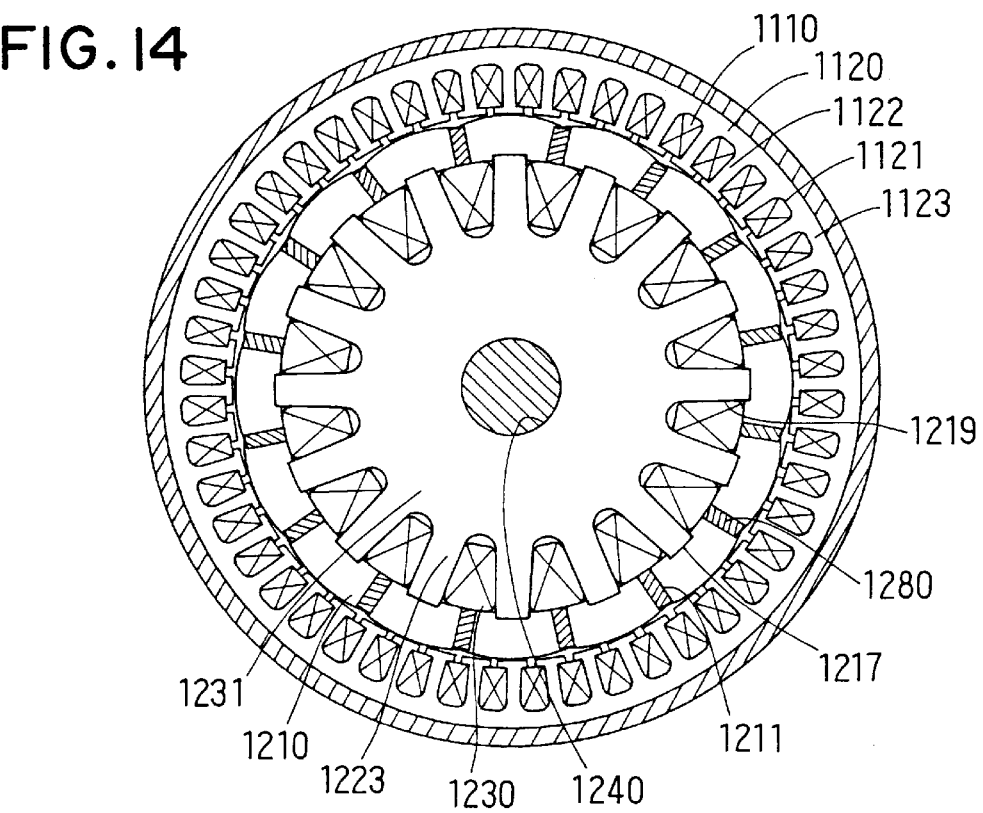
FIG. 14 is a schematic cross-sectional front view of the synchronous electric machine according to a seventh embodiment cut along line 14—14 in FIG. 15.
Figure 15:
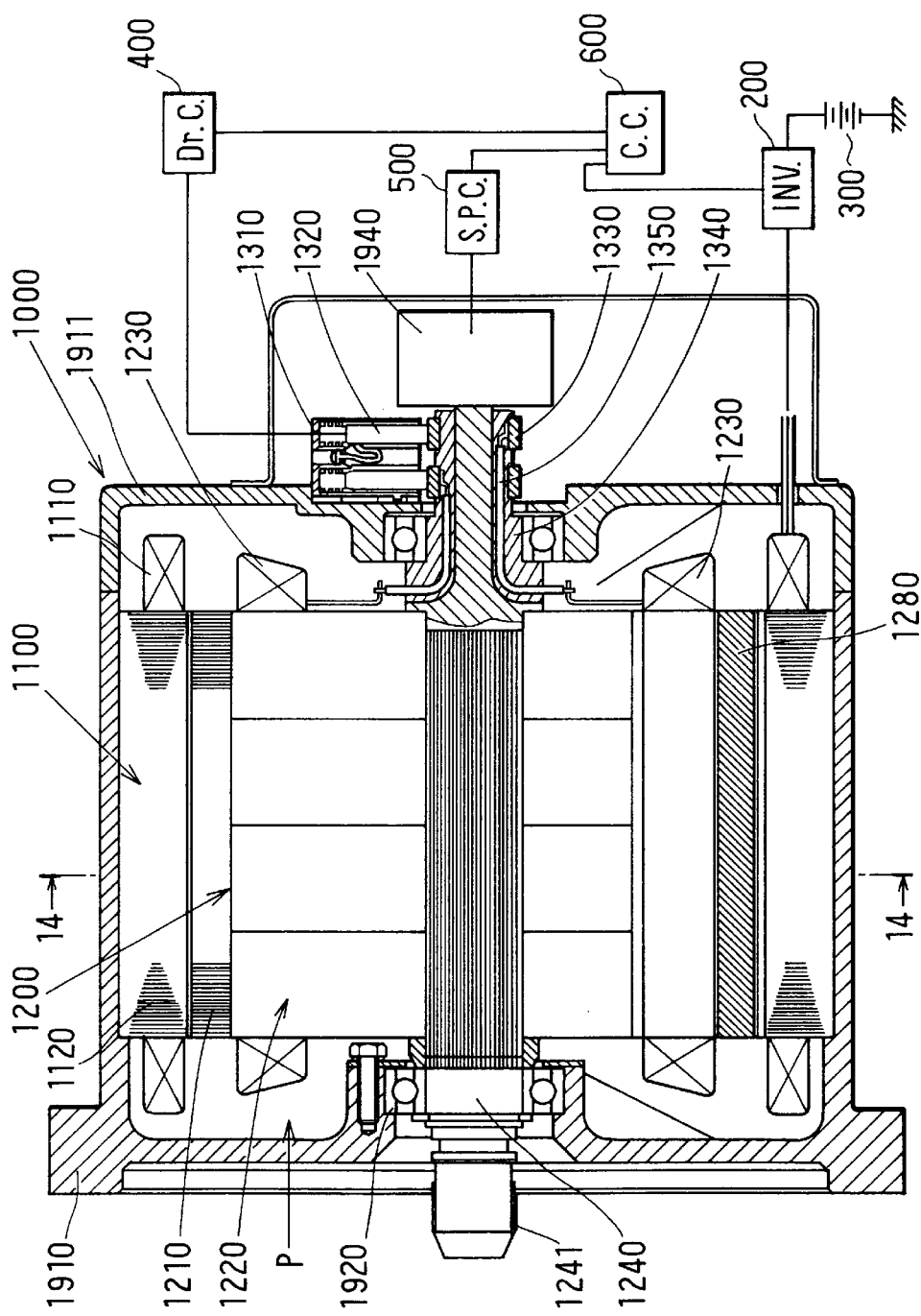
FIG. 15 is a schematic cross-sectional side view illustrating the synchronous electric machine according to the seventh embodiment.

A synchronous electric machine according to a sixth embodiment is described with reference to FIGS. 11–13.

Brushes 1320, slip ring 1330, lead wires 1350, and the related structure shown in FIG. 8 are omitted from this embodiment. Rotor 1200 of this embodiment is composed of front side rotor yoke 1270, rear side rotor yoke 1275, non-magnetic ring 1950 mechanically connecting front and rear yokes 1270, field coil 1230, bobbin 1274 made of soft iron to function as a part of the center core, and shaft 1240 having spline 1241. Bobbin 1274 is fixed to frame 1911 by bolts 1940.

Front rotor yoke 1270 is formed by forging a soft iron lump to have disk portion 1271, boss portion 1272, and a plurality of rib portions 1273. Rear rotor yoke 1275 is formed by forging soft iron to have ring portion 1276, and a plurality of rib portions 1277. Other portions are almost the same as the fifth embodiment. This structure can dispense with the current collecting unit composed of brushes and a slip ring.

A synchronous electric machine according to a seventh embodiment is described with reference to FIGS. 14–17. The same reference numerals in the figures correspond to portions described in the preceding embodiments.

Figure 16:
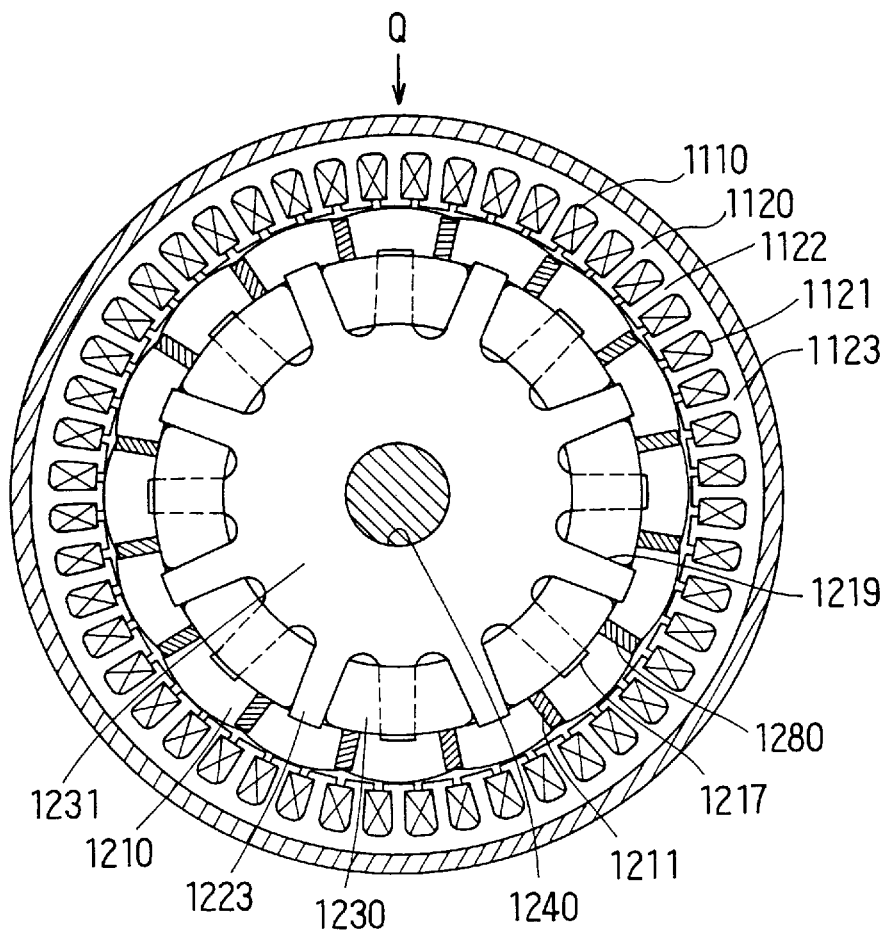
FIG. 16 is a schematic front view viewed from the portion indicated by P in FIG. 15.
Figure 17:
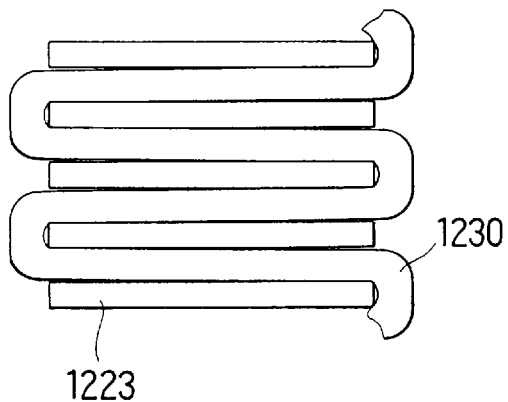
FIG. 17 is a schematic side view illustrating a field coil viewed from the portion indicated by Q in FIG. 15.

Rotor 1200 has sixteen ribs 1223 extending from cylindrical center core 1231 of rotor yoke 1220. Wave wound field coil 1230 is undulated around ribs 1223 with insulating members 1219 between ribs 1223 and field coil 1230, and between rotor yoke 1210 and field coil 1230, as shown in FIGS. 16 and 17. Rotor yoke 1210 has grooves 1217 between adjacent permanent magnets 1280, and rotor yoke 1220 is secured to rotor yoke 1210 with the outer ends of ribs 1223 being fit into grooves 1217, thereby securing field coil 1230. The outer periphery of ring-shaped rotor yoke 1210 has a plurality of convex surfaces, which correspond to the number of poles opposite the inner periphery of stator core 1120, so that the magnetic reluctance of the air gap can change in a sinusoidal wave shape. Each pair of opposite poles of permanent magnets is bypassed through one portion of rotor yoke 1210 adjacent to the N-pole of the same permanent magnet, one of ribs 1223 connected to the portion of rotor yoke 1210, center core 1231, and the other of ribs 1223 connected to the other portion of rotor yoke 1210 adjacent to the S-pole of the same permanent magnet.

Rotation position sensor 1940 is connected to signal processing circuit 500. Rotation position sensor 1940 can be composed of resolver rotor 1930 and resolver stator 1931 described with regard to the first embodiment and shown in FIG. 1.

Figure 18:
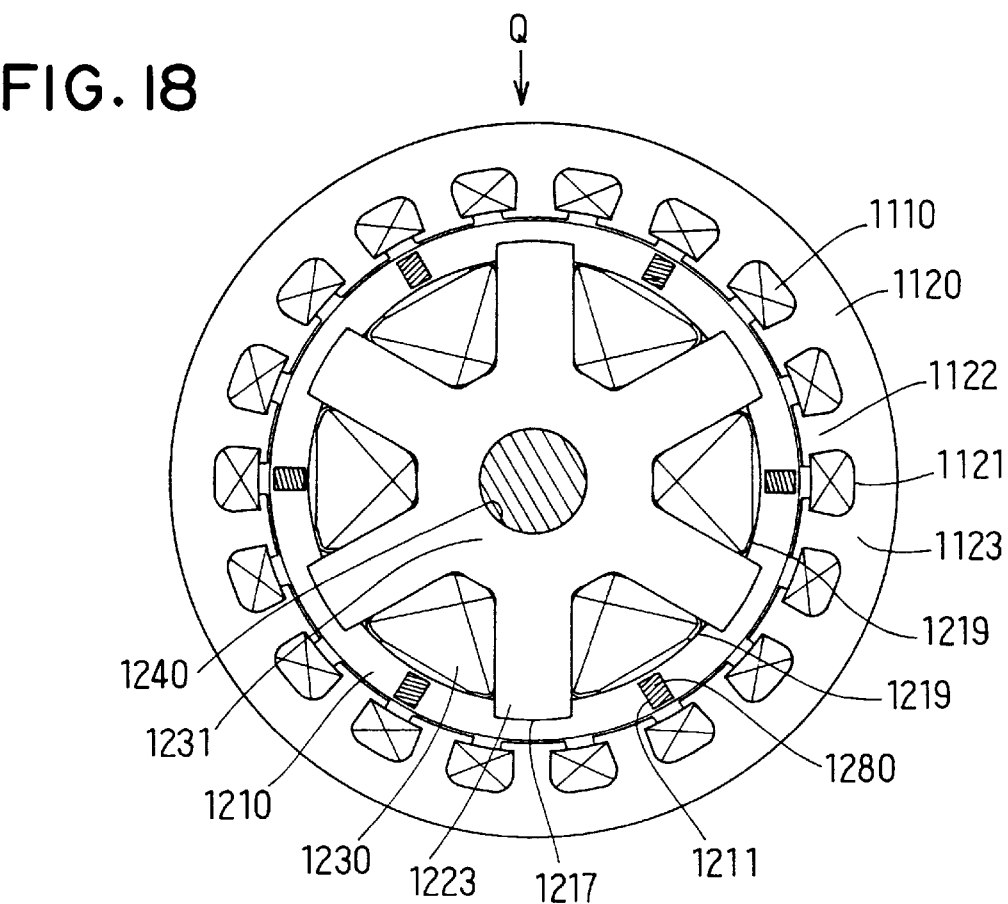
FIG. 18 is a schematic cross-sectional front view of the synchronous electric machine according to an eighth embodiment.

A synchronous electric machine according to an eighth embodiment is described with reference to FIGS. 18 and 19.

Figure 19:
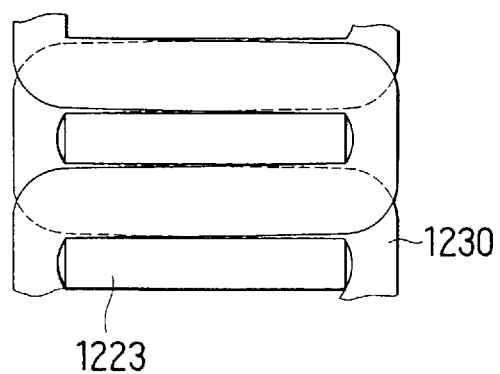
FIG. 19 is a schematic side view illustrating a field coil viewed from the portion indicated by Q in FIG. 18.

Rotor yoke 1220 has six ribs 1223 and field coil 1230 has two-layered wave windings, as shown in FIG. 19. This reduces the volume of the coil end portions of field coil 1230.

Figure 20:
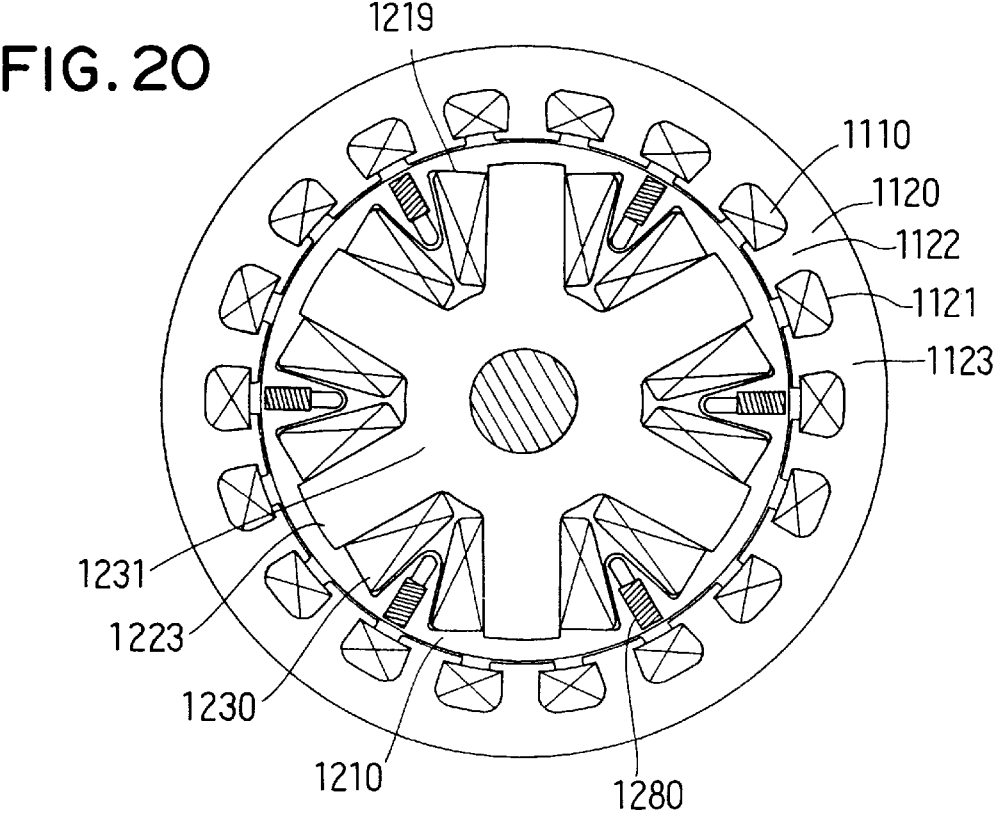
FIG. 20 is a schematic cross-sectional front view of the synchronous electric machine according to a ninth embodiment of the present invention.

A synchronous electric machine according to a ninth embodiment is described with reference to FIG. 20. Field coil 1230 has lap windings. Permanent magnets 1280 are disposed between adjacent lap windings of field coil 1230, thereby securing field coil 1230. Other portions are substantially the same as those of the above described embodiments.

Figure 21:
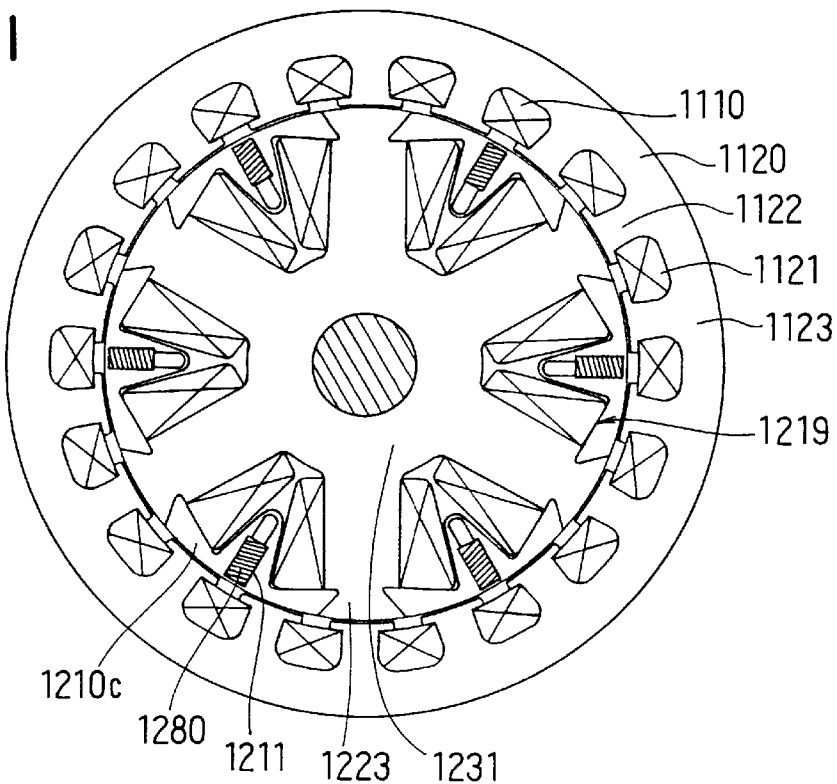
FIG. 21 is a schematic cross-sectional front view of the synchronous electric machine according to a tenth embodiment of the present invention.

A synchronous electric machine according to a tenth embodiment of the present invention is described with reference to FIG. 21. Ring-shaped rotor yoke of synchronous electric machine according to the ninth embodiment is divided into six wedge-shaped pieces 1210c disposed between adjacent ribs 1223. Each of pieces 1210c has rectangular hole 1211 for permanent magnet 1280 at the middle thereof. Other portions are substantially the same as those of the above described embodiments.

Figure 22:
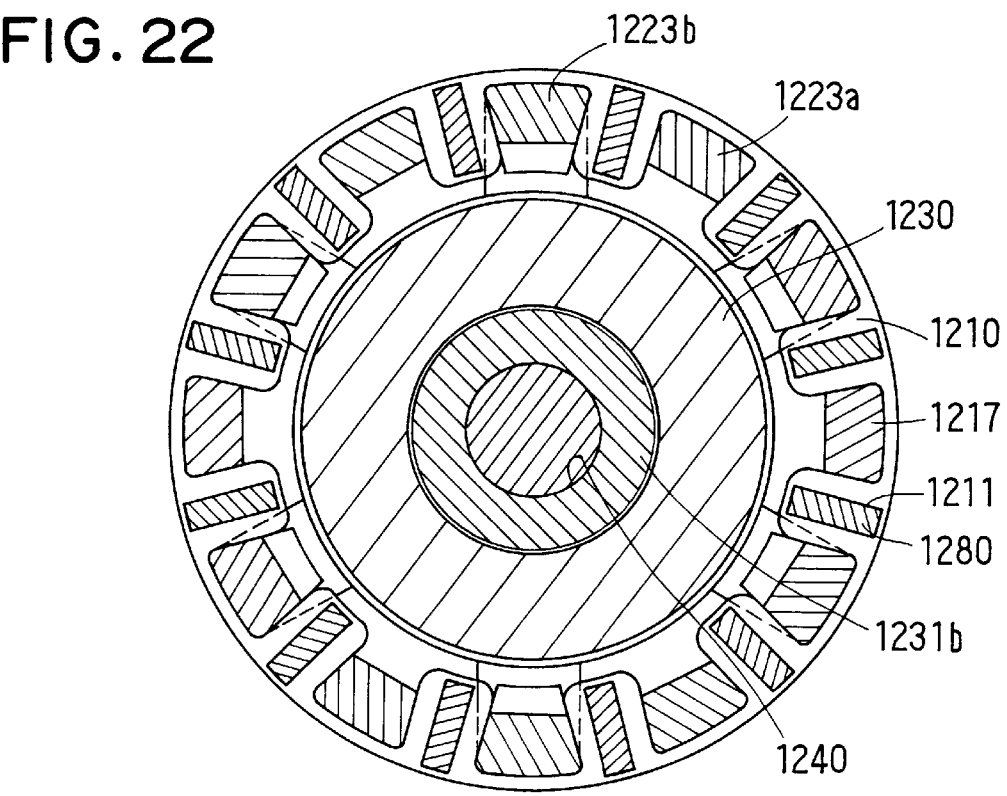
FIG. 22 is a schematic cross-sectional front view of a synchronous electric machine according to an eleventh embodiment of the present invention cut along line 22—22 shown in FIG. 23.

A synchronous electric machine according to an eleventh embodiment of the present invention is described with reference to FIGS. 22–24.

Rotor 1200 is composed of a ring-shaped rotor yoke 1210, front and rear rotor yokes 1220a, 1220b, field coil 1230 disposed inside front and rear rotor yokes 1220a, 1220b, and shaft 1240 press-fitted into front and rear yokes 1220a, 1220b. Ring-shaped rotor yoke 1210 is composed of laminated rolled magnetic sheets, and each of front and rear yokes 1220a, 1220b is forged from soft iron to have one of center cores 1231a, 1231b and a plurality of claw-shaped ribs 1223a, 1223b extending radially outward from respective center cores 1231a, 1231b so that each of ribs 1223a of front rotor yokes 1220a provides axially extending surface interposed between every two axially extending surfaces of ribs 1223b of rear rotor yoke 1220b. Ring-shaped rotor yoke 1210 has a plurality of grooves 1217 to which respective claw-shaped surfaces of front and rear rotor yokes 1220a, 1220b are fit. Each pair of the opposite poles of permanent magnets 1280 is bypassed through one portion of rotor yoke 1210 adjacent to N-pole of the same permanent magnet, one of front ribs 1223a connected to the portion of rotor yoke 1210, front and rear center cores 1231a, 1231b, one of rear ribs 1223b connected to the other portion of rotor yoke 1210 adjacent to S-pole of the same permanent magnet 1280.

Other portions are substantially the same as in the embodiments described above.

Figure 26:
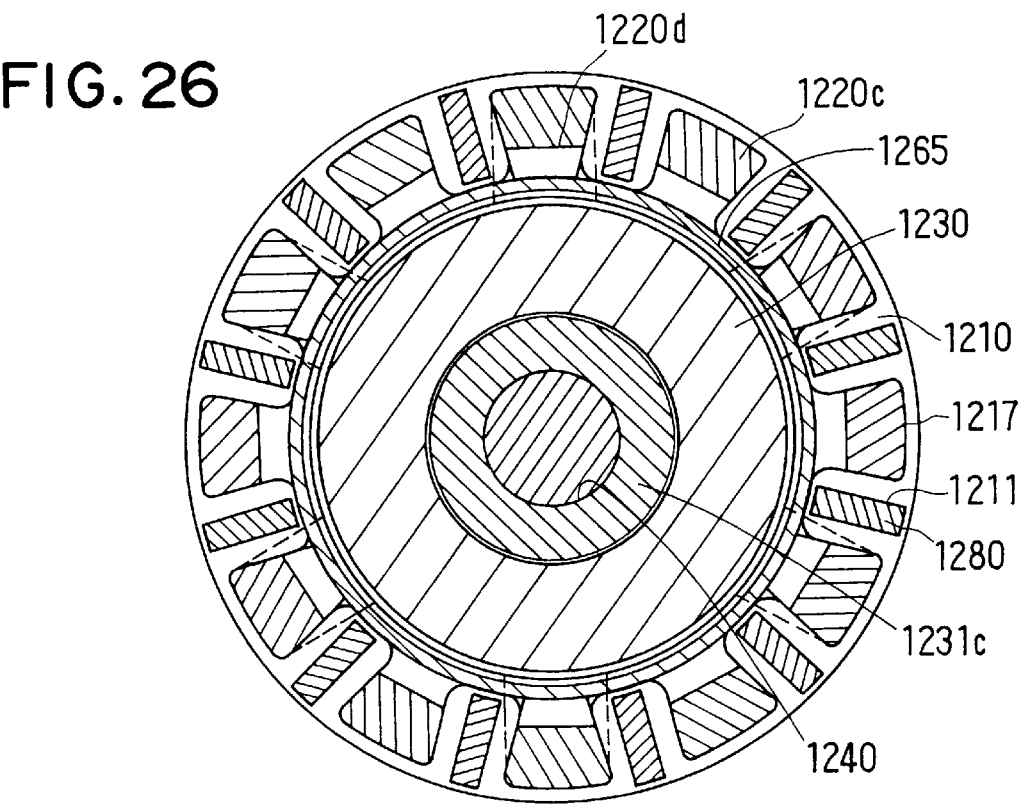
FIG. 26 is a schematic cross-sectional front view of the synchronous electric machine according to a twelfth embodiment of the present invention cut along line 26—26 in FIG. 25.
Figure 25:
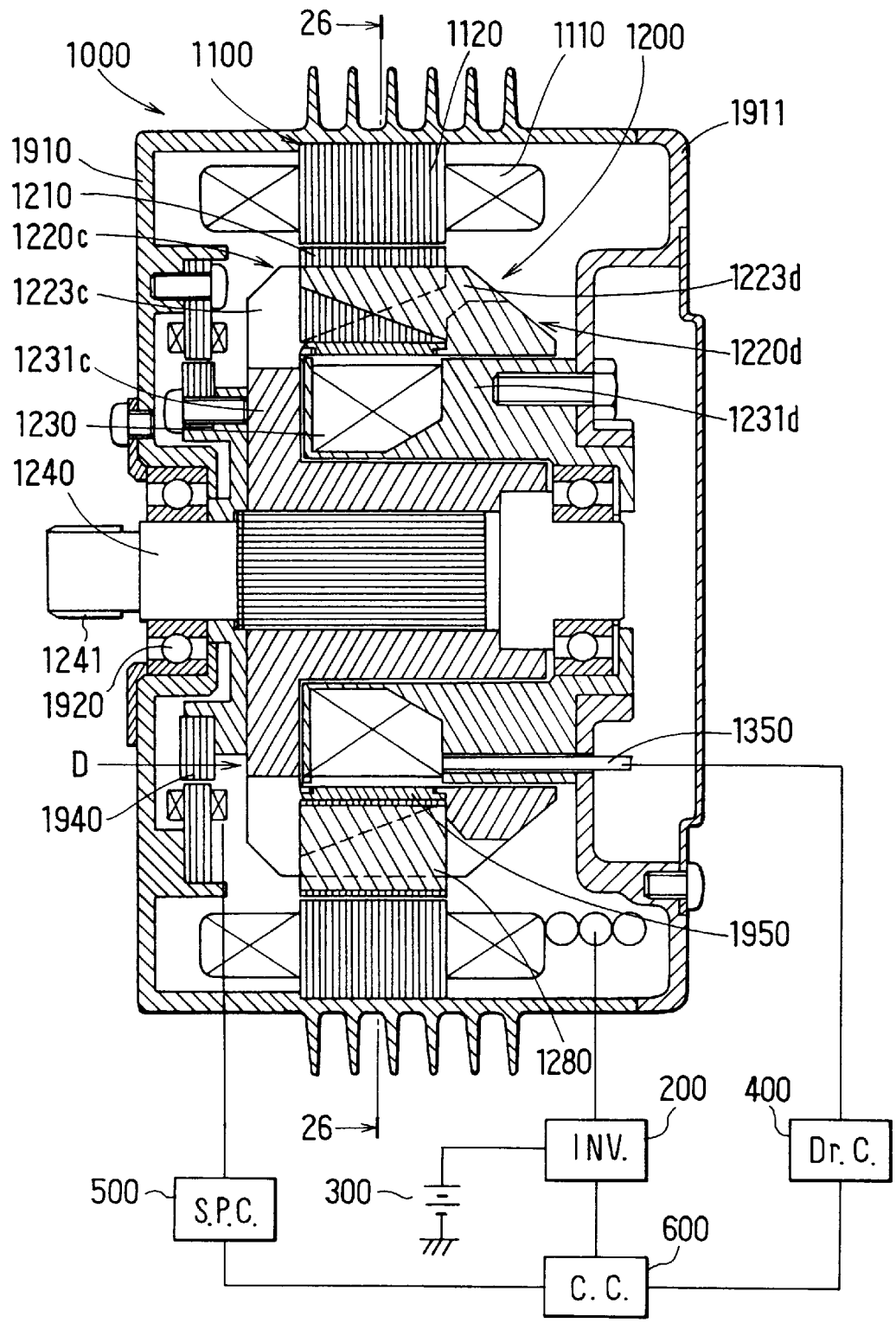
FIG. 25 is a schematic cross-sectional side view illustrating a synchronous electric machine according to a twelfth embodiment of the present invention.
Figure 27:
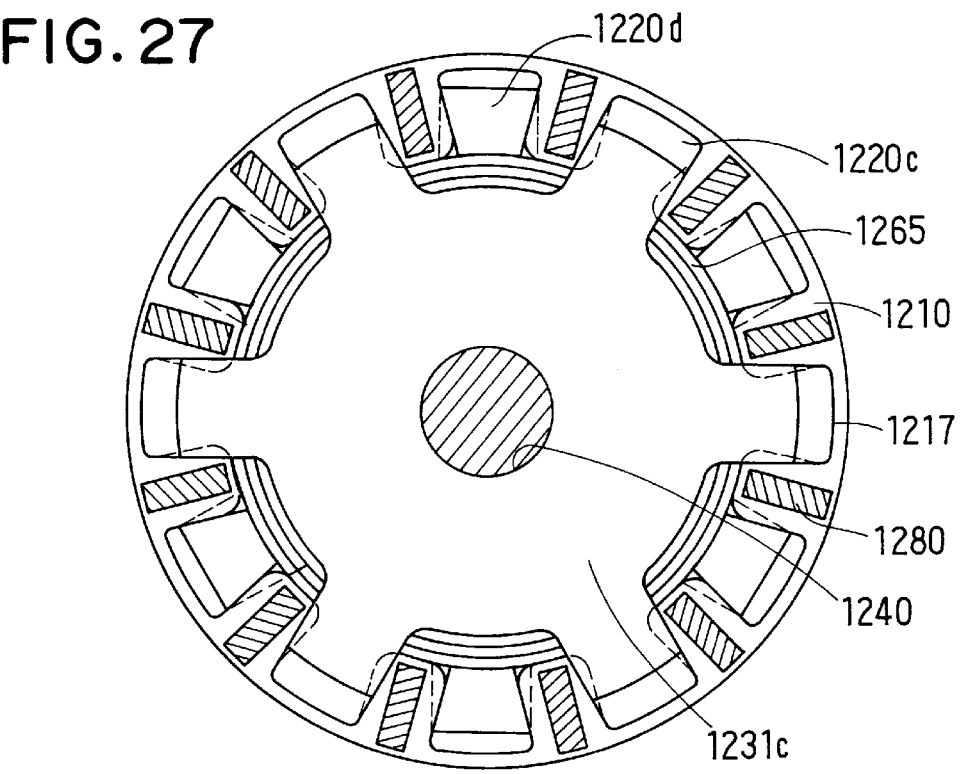
FIG. 27 is a schematic front view viewed from a portion indicated by D in FIG. 25.

A synchronous electric machine according to a twelfth embodiment of the present invention is described with reference to FIGS. 25–27.

Figure 23:
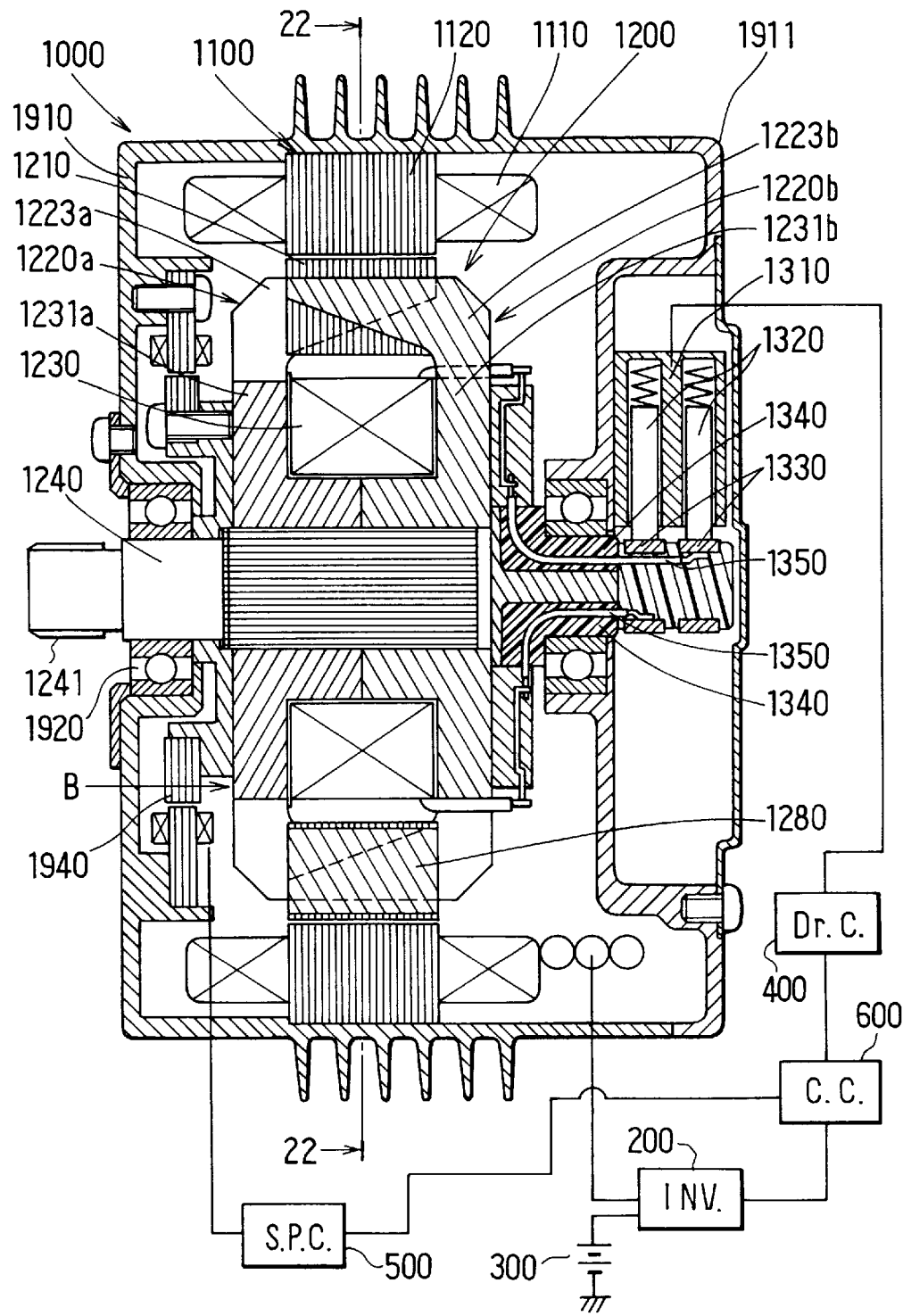
FIG. 23 is a schematic cross-sectional side view illustrating the synchronous electric machine according to the eleventh embodiment.
Figure 24:
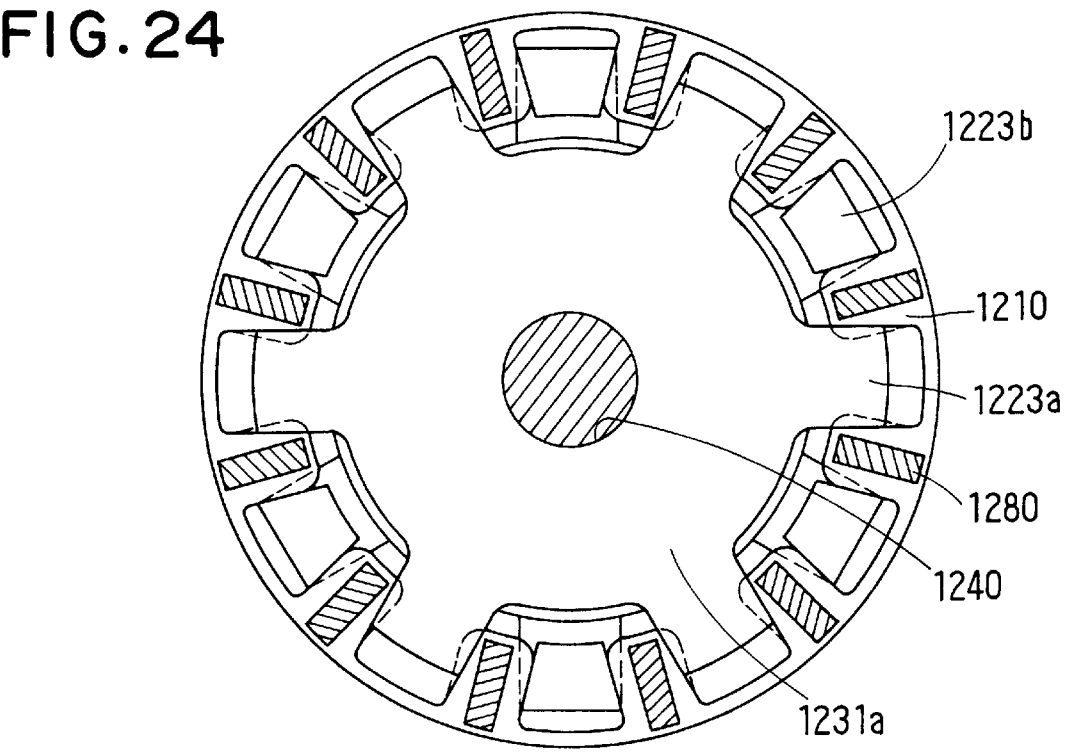
FIG. 24 is a schematic front view of the synchronous electric machine shown in FIG. 23 viewed from the portion indicated by B.

Brushes 1320, slip ring 1330, lead wires 1350, and the related structure shown in FIG. 23 are omitted from this embodiment. Rotor 1200 of this embodiment is composed of front rotor yoke 1220c having cylindrical front center core 1231c, rear rotor yoke 1220d having a cylindrical inner periphery, non-magnetic ring 1950 mechanically connecting front and rear yokes 1220c, 1220d, field coil 1230 and shaft 1240 having spline 1241. Rear rotor yoke 1220d is separated from cylindrical stationary center core 1231d, which is attached to rear frame 1911 by bolts and has an inner periphery spaced apart from the outer periphery of cylindrical front center core 1231c.

Other portions are similar to those described in the eleventh embodiment. This structure can dispense with the current collecting unit composed of brushes and a slip ring.

Figure 28:
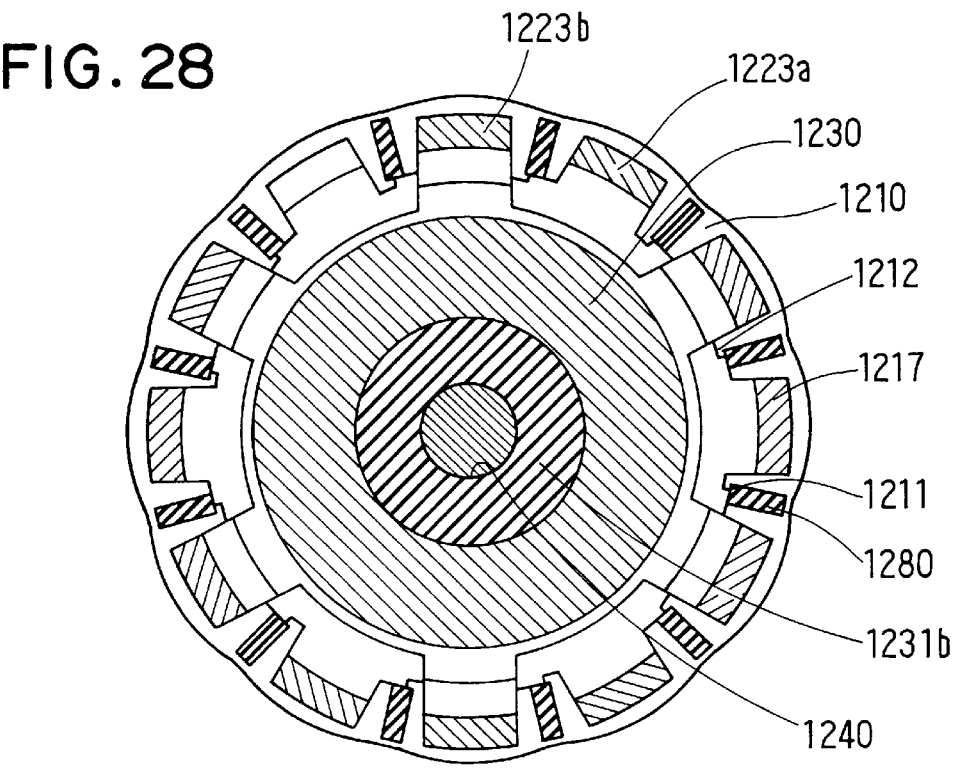
FIG. 28 is a schematic cross-sectional front view illustrating a synchronous electric machine according to a thirteenth embodiment of the present invention.

A synchronous electric machine according to a thirteenth embodiment is described with reference to FIG. 28.

Outer periphery of ring-shaped rotor yoke 1210 has a plurality of convex surfaces which correspond to the number of poles opposite to the inner periphery of stator core 1120, so that the magnetic reluctance of the air gap can change in a sinusoidal wave shape. Each rectangular hole 1211 has an open side 1212 along the inner periphery of ring-shaped rotor yoke 1210 so that the leakage magnetic flux through the open side 1212 can be reduced.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A synchronous electric machine, comprising:
   a stator having an armature winding and a rotor, wherein said rotor comprises:
   a rotor yoke made of a plurality of axially laminated magnetic sheets,
   a field coil disposed therein,
   a plurality of permanent magnets disposed in an outer circumference of said rotor yoke to form a N-pole and a S-pole on said outer circumference to supply magnetic flux to said stator, and
   a plurality of magnetic members respectively connected to portions of said outer circumference near said plurality of permanent magnets which magnetically bypass said N-pole and said S-pole and attach said laminated magnetic sheets together as a unit.

2. The synchronous electric machine as claimed in claim 1, wherein said rotor has a plurality of axially extending first holes on said outer circumference which accommodate said permanent magnets.

3. The synchronous electric machine as claimed in claim 2, wherein said rotor has a plurality of axially extending second holes, and
   said plurality of magnetic members comprises a plurality of magnetic pins inserted into said second holes.

4. The synchronous electric machine as claimed in claim 3, wherein said first holes are disposed radially on an inner side of said second holes,
   a magnetic isolation groove is disposed between each adjacent two of said permanent magnets, and
   said permanent magnets are magnetized in the radial direction.

5. The synchronous electric machine as claimed in claim 4, wherein an additional permanent magnet is disposed in each of said magnetic isolation grooves and is magnetized in the circumferential direction to increase said magnetic flux supplied to said stator.

6. A synchronous electric machine as claimed in claim 3, wherein said magnetic bypass further comprises a pair of rotor yokes disposed on opposite sides of said rotor and connected by said magnetic pins.

7. The synchronous electric machine as claimed in claim 1, wherein said rotor has a plurality of holes, each said hole having a rectangular shape and extending in the radial direction, each of said poles being disposed between adjacent two of said holes, and each of said permanent magnets is magnetized in the circumferential direction.

8. A synchronous electric machine as claimed in claim 1, wherein said rotor yoke further comprises an annular yoke portion, a boss portion, and a plurality of rib portions connecting said annular yoke portion and said boss portion.

9. A synchronous electric machine as claimed in claim 8, wherein said plurality of rib portions comprise first rib portions extending from one end of said boss portion, and second rib portions extending from the other end of said boss portion, thereby surrounding said field coil.

10. A synchronous electric machine as claimed in claim 9, wherein each one said first and second rib portions radially extends between circumferentially adjacent two other said rib portions.

11. A synchronous electric machine as claimed in claim 8, wherein each said permanent magnet is disposed between circumferentially adjacent two said rib portions.

12. A synchronous electric machine as claimed in claim 1, wherein said rotor further comprises a pair of nonmagnetic disk-like plates respectively attached to opposite ends of said rotor.

13. The synchronous electric machine, comprising:

a stator having an armature winding and a rotor disposed opposite to an inner periphery of said stator, wherein said rotor comprises:

a first rotor yoke having a magnetic center core and a plurality of magnetic ribs extending from said center core;

an annular second rotor yoke disposed on an outer periphery of said first rotor yoke and having a plurality of permanent magnets forming an N-pole and an S-pole on said outer periphery; and a field coil disposed in spaces between said magnetic ribs for providing controlled magnetic flux to said stator, and wherein said magnetic ribs are disposed to magnetically connect opposite sides of each of said permanent magnets, and said annular second rotor yoke retains said field coil.

14. The synchronous electric machine as claimed in claim 13, wherein said second annular rotor yoke has a plurality of axially extending holes which hold said permanent magnets.

15. The synchronous electric machine as claimed in claim 14, wherein each of said permanent magnets is magnetized in the circumference direction to form one of an N-pole and an S-pole, alternately, on said outer periphery of said rotor between adjacent two of said permanent magnets.

16. The synchronous electric machine as claimed in claim 13, wherein each of said N-pole and said S-pole of said annular second rotor yoke has a plurality of convex surfaces which changes a magnetic reluctance of an air gap between said outer periphery of said rotor and said inner periphery of said stator in a sinusoidal wave shape.

17. The synchronous electric machine as claimed in claim 13, wherein said annular second rotor yoke comprises a ring-shaped member made of laminated rolled magnetic material.

18. The synchronous electric machine as claimed in claim 17, wherein said ring-shaped member has a plurality of grooves on an inner periphery thereof to which said magnetic ribs of said first rotor yoke are fit, respectively.

19. The synchronous electric machine as claimed in claim 13, wherein said annular second rotor yoke comprises a plurality of wedge-shaped pieces, each of said wedge-shaped pieces having one of said permanent magnets disposed in the middle thereof.

20. The synchronous electric machine as claimed in claim 13, wherein said first rotor yoke comprises a forged soft iron member.

21. The synchronous electric machine as claimed in claim 13, wherein said field coil comprises a wave winding wound around said ribs.

22. A synchronous electric machine, comprising:

a stator having a armature winding;

a rotor having a plurality of cores, each said core being comprised of a plurality of axially laminated magnetic sheets and a field coil disposed in each said core;

a plurality of permanent magnets, each said permanent magnet being disposed in one of said cores to form a N-pole and a S-pole on an outer circumference thereof to supply magnetic flux to said stator; and a plurality of magnetic members respectively connected to portions of said outer circumference near said plurality of permanent magnets, which magnetically bypass said N-pole and said S-pole, wherein each of said plurality of magnetic members attaches said cores together as a unit.

23. A synchronous electric machine, comprising:

a stator having an armature winding and a rotor, wherein said rotor comprises:

a rotor yoke made of axially laminated magnetic sheets having an annular portion, center portion, and a plurality of rib portions magnetically connecting said annular portion and said center portion to provide a plurality of alternately different magnetic poles on said annular portion;

a field coil disposed in said rotor yoke to supply said magnetic poles with magnetic flux from said magnetic poles when energized;

a plurality of permanent magnets, each said permanent magnet being disposed between two of said plurality of magnetic poles to increase magnetic flux supplied to said stator; and a plurality of members which attach said rotor yoke together as a unit, wherein each of said members magnetically connects said magnetic poles having one polarity to said magnetic poles having the other polarity, thereby protecting said permanent magnets from excessive armature reaction generated by said armature winding.

24. A synchronous electric machine, comprising:

a stator having an armature winding;

a rotor having a plurality of cores composed of axially laminated magnetic sheets, a field coil disposed in said cores to provide N-poles and S-poles alternately on the outer circumference thereof to supply magnetic flux to said stator; and a plurality of permanent magnets disposed in said cores to increase said magnetic flux supplied to said stator, wherein said rotor comprises a plurality of members respectively disposed in said cores for magnetically bypassing said N-pole and S-pole to protect said permanent magnets from excessive armature reaction generated by said armature reaction and to attach said cores as a unit.

* * * * *